3,395,114
POLYETHERURETHANES STABILIZED WITH
ARYLENE-TRIS-PHENOLS
Albert Faires Smith, Wilmington, Del., assignor to E. I.
du Pont de Nemours and Company, Wilmington, Del.,
a corporation of Delaware
No Drawing. Filed July 30, 1964, Ser. No. 386,448
9 Claims. (Cl. 260—45.95)

ABSTRACT OF THE DISCLOSURE

Shaped articles comprised of a polyether-based segmented polyurethane stabilized against fume discoloration by 1,3,5-trimethyl-2,4,6-tris(3,5-di-t-butyl-4-hydroxybenzyl)benzene or 1,2,4,5-tetramethyl - 3,6-bis(3,5-di-t-butyl-4-hydroxybenzyl)benzene.

---

This invention relates to color-stabilized shaped articles prepared from polyurethane compositions. More particularly, the invention relates to spandex fibers which are resistant to yellowing upon exposure to atmospheric fumes.

It is known that spandex fibers on storage and upon exposure to atmospheric conditions are frequently subject to discoloration which results in an undesirable yellowing of the fibers. While the discoloration may be offset to some extent by tinting or by the use of other masking agents, such materials often cause the fibers to display undesirable color characteristics since they merely mask and do not inhibit the formation of the yellow color.

The known tendency to discolor under certain atmospheric conditions is quite pronounced in the case of polyether-based spandex, particularly polyether-based spandex containing in the polymer chain recurring aromatic ureylene residues, i.e., radicals of the formula

wherein X represents hydrogen or a monovalent organic radical and Ar represents an aromatic radical attached to the adjacent N of the formula through a carbon atom of an aromatic ring. Such spandex fibers yellow strongly under the action of the gaseous combustion products of hydrocarbon fuels.

This invention provides color-stabilized shaped articles of polyether-based polyurethane compositions. In particular, the stabilized compositions of this invention are resistant to yellowing on exposure to a smog atmosphere.

The advantages of this invention are attained by spandex fibers having a stabilizing quantity incorporated therein of 1,3,5-trimethyl - 2,4,6-tris(3,5-di-t-butyl - 4-hydroxybenzyl)benzene or 1,2,4,5-tetramethyl - 3,6-bis(3,5-di-t-butyl-4-hydroxybenzyl)benzene. Surprisingly, it has been found that either or both of these compounds provide superior stabilizing action, as compared to closely related compounds of the prior art.

The amount of stabilizer may vary within a wide range with amounts from a fraction of 1%, e.g., 0.1%, to about 5% or even 10% or more by weight based on the segmented polyurethane being effective. The optimum quantity for a particular fiber will vary and for reasons of economy should, of course, be kept as low as possible. The selection of the optimum quantity will depend on a number of factors such as the particular type of spandex fiber, the fiber geometry, and porosity. Preferably, amounts from about 0.3% to about 1.5% by weight are utilized.

The term "spandex fiber" is used in its generic sense herein to mean a manufactured fiber in which at least 85% of the fiber-forming substance is a long-chain, synthetic, segmented polyurethane. It is not intended, however, that the invention be limited to fibers of such segmented polyurethanes since the stabilization is achieved with other shaped articles, such as films and the like. The segmented polyurethane polymers which provide spandex fibers contain the recurring linkage

—O—CO—NH—

A substantial number of the urethane nitrogens are joined to aromatic radicals, which, as indicated above, are further attached to a ureylene linkage —NH—CO—NX—, wherein X is hydrogen or a monovalent organic radical such as methyl, ethyl or phenyl. Polyurethanes of this type containing ether linkages in the chain appear to be most susceptible to the discoloring action of a smog atmosphere. Generally speaking, these segmented polyurethanes are prepared from hydroxyl-terminated polyethers of low molecular weight. Reaction of the polyether with a molar excess of organic diisocyanate, preferably an aromatic diisocyanate, produces an isocyanate-terminated polymeric intermediate, which may then be chain-extended with a difunctional, active hydrogen-containing compound, such as water, hydrazine, organic diamines, glycols, hydrazides, amino alcohols, etc.

Among the segmented polyurethanes of the spandex type are those described in several patents among which are U.S. Patents 2,929,801, 2,929,802, 2,929,803, 2,929,-804, 2,953,839, 2,957,852, 2,999,839, 3,040,003, and 3,071,557. As described in the aforementioned patents, the segmented polyurethane elastomers are comprised of amorphous segments derived from polymers having a melting point below about 50° C. and a molecular weight above about 600, and contain from about 5% to 40% of crystalline segments derived from a polymer having a melting point above about 200° C. in the fiber-forming molecular weight range. Most of such polyurethanes, when in filament form, have elongations greater than 150%, tensile recovery of over 90%, and a stress decay of less than 20%, as defined in U.S. 2,957,852. The disclosures of the above patents are incorporated herein by reference.

The polyether glycol from which the "soft segment" is derived may contain a single type of linkage, such as in the poly(alkylene oxide) glycols, or it may have more than one type of linkage, as in the polyoxythiaalkylene glycols and in the polyetherester glycols. Even where the linkages are the same, the composition may be a copolymer, such as a copolyether prepared from a mixture of glycols. The polyether glycols may be substituted with halogen, alkyl, and similar groups, which do not interfere with the subsequent polymerization reactions. Representative polyethers which may be used include the poly(alkylene oxide) glycols, such as polyethylene glycol, polypropylene glycol, and polytetramethylene ether glycol, and the polyacetals, such as polydioxolane and polymers from the reaction of formaldehyde with hexamethylene glycol. For the purposes of this invention, the preferred polyether glycols include polytetramethylene ether glycol and glycols of polytetramethylene ether having urethane and/or ester groups in the polymer chain.

Polyesters may be used with the polyethers either as an added component or as an integral part of the polyether molecule, thus forming a polyetherester. Examples of such polyetheresters are poly(diethylene glycol adipate) and poly(triethylene glycol adipate). In general, the term "polyether" as used herein includes mixtures and/or copolymers containing at least 20 mol percent of polyether. Thus, the term includes etherester copolymers from an ether-containing glycol, as noted above, as well as a copolymer prepared from a mixture of an ether-containing glycol and a non-ether-containing glycol such that at least 20% of the non-carbon atoms in the polymer chain are ether-oxygen atoms. Also, the term includes mixtures of polyethers with other suitable soft segments, for example, a mixture of polyether glycol and polyester glycol containing at least 20 mol percent of polyether glycol.

The hydroxyl-terminated soft segment is generally reacted with an organic diisocyanate which is preferably an aromatic diisocyanate, as indicated hereinabove. Suitable aromatic diisocyanates include p-phenylene diisocyanate, 4,4'-biphenylene diisocyanate, p,p'-methylenediphenyl diisocyanate, and p,p'-isopropylidenediphenyl diisocyanate. Aliphatic and cycloaliphatic diisocyanates, for example, 4,4' - methylenedicyclohexyl diisocyanate, are also suitable. The diisocyanates may contain other substituents, although those which are free from reactive groups other than the two isocyanate groups, are ordinarily preferred. The organic diisocyanate is not critical, and any of those disclosed in the prior art pertaining to spandex may be used.

The difunctional, active hydrogen-containing compounds suitable as chain-extenders include a wide variety of compounds as indicated hereinabove. Organic diamines are preferred. Suitable diamines include ethylenediamine, N,N' - dimethyl-ethylenediamine, tetramethylenediamine, 1,2-propylenediamine, m-xylylenediamine, p-xylylenediamine, cyclohexylene diamine, piperazine, and many others. Symmetrical aliphatic diamines are preferred, but aromatic diamines, e.g., p-phenylenediamine and p,p'-methylenedianiline, may be used. If the diisocyanate is non-aromatic, the use of an aromatic chain-extender provides the aromatic ureylene linkage in the spandex polymers to which this invention is particularly pertinent.

The stabilizers useful in the present invention are, as noted above, 1,3,5 - trimethyl-2,4,6-tris(3,5-di-t-butyl-4-hydroxybenzyl)benzene and 1,2,4,5 - tetramethyl-3,6-bis (3,5 - di-t-butyl-4-hydroxybenzyl)benzene. The former compound may be prepared as described in U.S. Patent 3,026,264. The latter compound may be prepared as described in U.S. Patent 3,062,895.

Although the stabilizer may be incorporated in the shaped article by various procedures, preferably it is dissolved in a solution of the segmented polyurethane prior to shaping. In this method, the polyurethane should be substantially free of unreacted isocyanate groups. The solution may then be cast into a film in the conventional way. Solutions of the spandex polymer containing the stabilizer may also be spun into fibers by the usual extrusion techniques, e.g., dry spinning.

Other methods for incorporating the stabilizer are similar to those used for incorporating dyestuffs. For example, the stabilizer may be dissolved in a suitable solvent to which the fibers are inert, i.e., non-reactive, and the fibers immersed in the treating solution. Or the stabilizer may be dispersed in a liquid medium and applied to the fiber by passing it through a treating bath containing the dispersed stabilizer. Alternatively, the stabilizer of this invention may be incorporated in the spin finish and applied to the fiber immediately after extrusion.

The spandex fibers may be treated alone or may be incorporated in fabrics with fibers of different compositions. While the treatment of fabrics containing other fibers as well as spandex fibers requires more of the treating agent, the other fibers are not adversely affected. Both natural and synthetic fibers, as well as blends thereof, may be included in the fabrics without impairing the stabilization of the spandex fibers. However, the preferred method of stabilizing the spandex is to incorporate the stabilizer in the spinning solution before extrusion.

This invention is also applicable to shaped articles other than fibers and films prepared, e.g., by molding, from segmented polyurethanes as hereinbefore defined. Additives, fillers, plasticizers, pigments, and the like, which are conventionally used with segmented polyurethanes, may be used as desired with the stabilizers of this invention.

The principal advantage attained by the present invention resides in providing spandex fibers which are stabilized against yellowing due to a smog atmosphere. In addition to the color stability, a further advantage is the protection of the stabilized fibers against loss of physical properties under conditions of high temperature or on exposure to ultraviolet light.

This invention will be further illustrated, but is not intended to be limited, by the following examples in which parts and percentages are by weight unless otherwise specified.

In the examples, the test for smog discoloration is performed by exposing fiber samples to atmospheric pollutants generated in a laboratory test chamber. Samples of continuous-filament spandex are wrapped on a metal frame and are exposed to a synthetic atmosphere consisting of air containing small amounts of nitrogen dioxide, sulfur dioxide and 2-pentene for the length of time indicated in the examples, during which exposure the samples are irradiated by a combination of ultraviolet and visible light. The pollutants diluted with nitrogen and the air are supplied continuously to the test chamber at the following concentrations: four parts per million nitrogen dioxide, two parts per million sulfur dioxide, and eight parts per million 2-pentene, based on the total gaseous mixture. The samples are measured for degree of yellowness as indicated hereinbelow, both before and after exposure.

The above-described synthetic atmosphere has been found to simulate a "photochemical smog," thereby providing an accelerated discoloration test for reproducibly discoloring spandex yarn. It has been found that the color development obtained on exposure of samples in the laboratory test for five hours correlates well with a six-week exposure of elastic fabrics in Los Angeles, California, an area well known for smog problems.

The degree of yellowness, referred to in the examples as $b$ value, is determined from colorimetric data obtained by analyzing continuous filament samples in aggregates which are about three inches square. The reflectance ratios of the samples in the green and blue filter settings of a colorimeter are measured, using a Model IV Color Master Differential Colorimeter, manufactured by Manufacturers Engineering and Equipment Corporation, Hatboro, Pa., and calibrated against the manufacturer's standard reference plates and the National Bureau of Standards' certified reflectance plates. Three readings are taken on each of the samples, one of the measurements for the filament sample being made with the sample rotated 90° from the position of the first reading. The $b$ values are then calculated from the average of three readings, using the following formula $$b = 42.34(G^{1/3} - B^{1/3})$$

where G represents the reflectance ratio with the green filter and B represents the reflectance ratio with the blue filter.

Example I

Polytetramethylene ether glycol of molecular weight about 2000 and p,p'-methylenediphenyl diisocyanate are intimately mixed in the ratio of 2 mols of diisocyanate per mol of polyether glycol and are reacted to yield an isocyanate-terminated polyether. The isocyanate-terminated polyether, cooled to about 50° C. is conducted at a rate of 132 parts per hour into a mixer, and a stream of N,N-dimethylacetamide is added at 162 parts per hour. The mixture (45% solids) is discharged continuously into a pipeline and conducted to a second mixer, in which it is intimately mixed with a stream of 86.7 parts of dimethylacetamide, 6.9 parts of m-xylylenediamine and 0.5 part of diethylamine, added at a total rate of 94 parts per hour. The residence time is 3–4 minutes, and the temperature rises from about 40° C. to 90° C. The emerging polymer solution contains approximately 36% solids and has a viscosity of about 2500 poises at 40° C. The polymer has an inherent viscosity of 1.1, measured at 25° C.

in hexamethylphosphoramide at a concentration of 0.5 gram per 100 ml. of solution.

To 278 parts of the viscous polymer solution is added one part of 1,3,5-trimethyl-2,4,6-tris(3,5-di-t-butyl-4-hydroxybenzyl)benzene. This provides 1% of the stabilizer based on the polymer solids. The solution is dry-spun in the usual way to produce spandex filaments, which possess the following as-spun physical properties: denier—430; tenacity—.735 g.p.d.; elongation—523%. After being heated in air for eight hours at 150° C., the filaments have a tenacity of 0.745 g.p.d. and an elongation of 614%.

Control spandex filaments are dry-spun from a portion of the polymer solution to which none of the above-mentioned stabilizer is added. The control filaments possess the following as-spun physical properties: denier—450; tenacity—0.755 g.p.d.; elongation—594%. After exposure to air for eight hours at 150° C., the tenacity falls to .027 g.p.d. and the elongation to 202%.

Other samples of the two spandex materials described above are exposed in the test for smog discoloration for a period of four hours. The following results are obtained:

b VALUES

|  | As Prepared | After Exposure | Δb |
| --- | --- | --- | --- |
| Sample containing 1% stabilizer | 0.3 | 17.6 | 17.3 |
| Control | 0.2 | 28.4 | 28.2 |

The advantage of the stabilizer is easily seen from the data in the preceding table. Comparable results can be obtained when the polyether glycol in the spandex is replaced with a copolyether glycol of polytetramethylene ether and polypropylene ether, or when the diisocyanate of the spandex is replaced with p-phenylene diisocyanate or with 2,4-tolylene diisocyanate, or when the m-xylylenediamine chain-extender is replaced with ethylenediamine or with cyclohexylenediamine.

Other closely related, phenolic stabilizers of the prior art, i.e., 4,4'-butylidenebis(6-t-butyl-m-cresol) ("Santowhite" powder), 2,6-di-t-butyl-4-methylphenol ("Ionol" 100) and 4,4'-methylenebis(2,6-di-t-butylphenol) ("Antioxidant 702"), when similarly used at 1% concentration, produce either an objectionably high initial color in the spandex or else fail to protect the spandex against yellowing in the smog discoloration test, as shown in the following table:

b VALUES

| Stabilizer | As Prepared | After Exposure | Δb |
| --- | --- | --- | --- |
| "Ionol" 100 | 0.1 | 32.5 | 32.4 |
| "Santowhite" powder | 1.0 | 27.4 | 26.4 |
| "Antioxidant 702" | 12.6 | 32.3 | 19.7 |

Example II

To 278 parts of the viscous polymer solution described in the first paragraph of Example I is added 1 part of 1,2,4,5-tetramethyl-3,6-bis(3,5-di-t-butyl-4-hydroxylbenzyl)benzene, yielding a mixture which contains 1% of the stabilizer based on polymer solids. This solution is dry-spun in the usual way to produce spandex filaments having the following as-spun physical properties: denier—400; tenacity—.605 g.p.d.; elongation—497%. After exposure to air for eight hours at 150° C., the tenacity is .620 g.p.d. and the elongation is 590%.

Other samples of the filaments are exposed for four hours in the smog discoloration test. The following results are obtained:

b VALUES

Sample containing 1% stabilizer:
As prepared _____ 1.4
After exposure _____ 22.1
Δb _____ 20.7

Example III

To 278 parts of the viscous polymer solution prepared as in the first paragraph of Example I is added 1 part of 1,3,5-trimethyl-2,4,6-tris-(3,5-di-t-butyl-4-hydroxybenzyl)benzene and 16.7 parts of a TiO₂ slurry in dimethylacetamide containing 30% TiO₂. This provides 1% of the stabilizer and 5% TiO₂ based on the polymer solids. The solution is dry spun in the usual way to produce spandex filaments of 420 denier. Control filaments are prepared using the TiO₂ but none of the above stabilizer. The filaments are exposed 4 hours in the smog discoloration test with these results:

b VALUES

|  | As Prepared | After Exposure | Δb |
| --- | --- | --- | --- |
| Sample containing 1% Stabilizer, 5% TiO₂ | 0.1 | 9.2 | 9.1 |
| Control, 5% TiO₂ | 0.3 | 14.3 | 14.0 |

Other closely related phenolic stabilizers of the prior art when used similarly give b values, after exposure, of more than 16.

Thus the following results are obtained when spandex filaments are produced from the above polymer with 5% TiO₂ and 1% of the indicated stabilizers:

b VALUES

| Stabilizer | As Prepared | After Exposure | Δb |
| --- | --- | --- | --- |
| "Ionol" 100 | −0.4 | 19.6 | 20.0 |
| "Santowhite" powder | 0.6 | 16.1 | 15.5 |
| "Antioxidant 702" | 11.9 | 16.2 | ¹4.3 |

¹ Notwithstanding the extremely low Δb value, the filaments would be unsuitable for commercial use because of the unacceptably high color before exposure.

Example IV

To 278 parts of the viscous polymer solution of the first paragraph of Example I is added 1 part of 1,2,4,5-tetramethyl-3,6-bis(3,5-di-t-butyl-4-hydroxybenzyl)benzene and 16.7 parts of a TiO₂ slurry containing 30% TiO₂, yielding a mixture which contains 1% of the stabilizer and 5% TiO₂ based on polymer solids. The solution is spun in the usual way to produce spandex filaments of 420 denier. The filaments are exposed 4 hours in the smog discoloration test with these results:

b VALUES

Sample containing 1% stabilizer, 5% TiO₂:
As prepared _____ −0.2
After exposure _____ 11.4
Δb _____ 11.6

What is claimed is:

1. A manufactured fiber in which at least 85% of the fiber-forming substance is a long-chain, synthetic, polyether-based segmented polyurethane stabilized against fume discoloration by having included therein a stabilizing quantity of a compound selected from the class consisting of 1,3,5-trimethyl-2,4,6-tris(3,5-di-t-butyl-4-hydroxybenzyl)benzene and 1,2,4,5-tetramethyl-3,6-bis(3,5-di-t-butyl-5-hydroxybenzyl)benzene.

2. The fiber of claim 1 wherein said compound is present in an amount up to about 10% by weight of said fiber.

3. The fiber of claim 1 wherein said compound is present in an amount between about 0.1% and 5% by weight of said fiber.

4. A shaped article of a long chain synthetic elastomer comprised of at least 85% of a polyether-based segmented polyurethane stabilized against fume discoloration by the presence therein of a stabilizing quantity of a compound selected from the class consisting of 1,3,5-trimethyl-2,4,6-tris(3,5-di-t-butyl-4-hydroxybenzyl)-benzene and 1,2,4,5-tetramethyl-3,6-bis(3,5-di-t-butyl-4-hydroxybenzyl)benzene.

5. The shaped article of claim 4 wherein said compound is present in an amount from about 0.1% to about 5% by weight of said shaped article.

6. The shaped article of claim 5 wherein said polyurethane is prepared by chain extending an isocyanate-terminated polymeric intermediate with m-xylylenediamine.

7. The shaped article of claim 6 wherein said compound is present in an amount from about 0.3% to about 1.5% by weight of said shaped article.

8. The shaped article of claim 4 wherein said compound is 1,3,5-trimethyl-2,4,6-tris(3,5-di-t-butyl-4-hydroxybenzyl)benzene.

9. The shaped article of claim 4 wherein said compound is 1,2,4,5-tetramethyl-3,6-bis(3,5-di-t-butyl-4-hydroxybenzyl)benzene.

References Cited

UNITED STATES PATENTS

| 2,915,496 | 12/1959 | Swart et al. | 260—45.95 |
| 3,206,431 | 9/1965 | Doyle et al. | 260—45.95 |
| 3,062,895 | 11/1962 | Martin et al. | 260—45.95 |
| 3,271,337 | 9/1966 | Goddu | 260—45.95 |

DONALD E. CZAJA, *Primary Examiner.*

H. E. TAYLOR, *Assistant Examiner.*